(12) United States Patent
Chen et al.

(10) Patent No.: US 10,289,157 B2
(45) Date of Patent: May 14, 2019

(54) HEAD-MOUNTED DISPLAY DEVICE

(71) Applicant: Quanta Computer Inc., Taoyuan (TW)

(72) Inventors: Chun-Lung Chen, Taoyuan (TW);
Chun-Yun Tseng, Taoyuan (TW);
Yuan-Peng Yu, Taoyuan (TW);
Hung-Hsun Tai, Taoyuan (TW);
Po-Hui Lin, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 122 days.

(21) Appl. No.: 15/364,324

(22) Filed: Nov. 30, 2016

(65) Prior Publication Data

US 2018/0059715 A1 Mar. 1, 2018

(30) Foreign Application Priority Data

Aug. 30, 2016 (TW) .............................. 105127923 A

(51) Int. Cl.
*G06F 1/16* (2006.01)
*G02B 27/01* (2006.01)
*G09G 5/00* (2006.01)

(52) U.S. Cl.
CPC ........... *G06F 1/163* (2013.01); *G02B 27/017* (2013.01); *G06F 1/1632* (2013.01); *G06F 1/1637* (2013.01); *G06F 1/1675* (2013.01); *G09G 5/003* (2013.01)

(58) Field of Classification Search
CPC ...... G06F 1/163; G06F 1/1675; G06F 1/1632; G06F 1/1637; G09G 5/003
USPC ......................................................... 345/7–8
See application file for complete search history.

(56) References Cited

U.S. PATENT DOCUMENTS

| 8,577,427 | B2 * | 11/2013 | Serota | G02B 27/017 345/8 |
| 2010/0103078 | A1 * | 4/2010 | Mukawa | G02B 27/0172 345/8 |
| 2011/0012814 | A1 * | 1/2011 | Tanaka | G02B 27/0176 345/8 |
| 2011/0043436 | A1 * | 2/2011 | Yamamoto | G02B 27/0172 345/8 |
| 2011/0227813 | A1 * | 9/2011 | Haddick | G02B 27/017 345/8 |
| 2012/0235900 | A1 | 9/2012 | Border et al. | |
| 2015/0198807 | A1 * | 7/2015 | Hirai | G02B 27/017 345/8 |
| 2015/0260995 | A1 * | 9/2015 | Mukawa | G02B 27/0172 345/8 |
| 2015/0338659 | A1 * | 11/2015 | Gallery | A42B 3/042 345/8 |

(Continued)

FOREIGN PATENT DOCUMENTS

| CN | 204302573 U | 4/2015 |
| TW | M527552 U | 8/2016 |

*Primary Examiner* — Vinh T Lam
(74) *Attorney, Agent, or Firm* — Rabin & Berdo, P.C.

(57) ABSTRACT

A head-mounted display device includes a wearable device, a display mainframe and a pivoting mechanism. The display mainframe includes a cover body and a display-receiving portion connected to one side of the cover body. The cover body is provided with a light transmissive area and an accommodation area in which the light transmissive area is arranged between the accommodation area and the display-receiving portion. The pivoting mechanism is pivotally connected to the wearable device and the display mainframe.

9 Claims, 8 Drawing Sheets

(56) References Cited

U.S. PATENT DOCUMENTS

2016/0025984 A1* 1/2016 Hino ................. G02B 26/0816
                                                    345/8
2016/0195726 A1* 7/2016 Fujishiro ............ G02B 27/0176
                                                    345/8
2016/0216519 A1* 7/2016 Park .................. G02B 27/0176

* cited by examiner

HEAD-MOUNTED DISPLAY DEVICE

RELATED APPLICATIONS

This application claims priority to Taiwan Application Serial Number 105127923, filed on Aug. 30, 2016, which is herein incorporated by reference.

BACKGROUND

Field of Disclosure

The present disclosure relates to a display device. More particularly, the present disclosure relates to a head-mounted display device.

Description of Related Art

With the improvement of technology, a head-mounted display device for virtual reality (VR) has been launched to selling markets. A user wearing the head-mounted display device can watch a virtual world of three-dimensional space reproduced by computer simulation through the head-mounted display device, and when the user turns, a new virtual-image field in the virtual world of the three-dimensional space can be instantly provided so as to enhance real-world viewing experience of the user.

However, when the user wearing the head-mounted display device temporarily does not use the head-mounted display device, the user must take off the head-mounted display device away to change the vision of the user from the virtual view to the real view. This situation may cause inconvenience to the user, and reduces the users desire to utilize the technology.

SUMMARY

An aspect of the disclosure is to provide a head-mounted display device which enables a user to conveniently and rapidly switching the sight line of the user between the virtual view and the real view so as to further improve user convenience.

In one embodiment, the head-mounted display device includes a wearable device, a display mainframe and at least one pivoting mechanism. The display mainframe includes a cover body and a display-receiving portion. The cover body is formed with a light-transmissive area and an accommodation area. The display-receiving portion is connected to one side of the cover body, and the light transmissive area is arranged between the accommodation area and the display-receiving portion. The pivoting mechanism is pivotally connected to the wearable device and the display mainframe.

In one or more embodiments of the present disclosure, the wearable device includes a pivotal sleeve disposed at one lateral edge of the cover body. One end of the pivoting mechanism extends into an inner passage of the pivotal sleeve.

In one or more embodiments of the present disclosure, the display mainframe further includes a pivot cap. The pivot cap receives the other end of the pivoting mechanism, and the pivot cap is fastened on a surface of the cover body through a bolt.

In one or more embodiments of the present disclosure, the pivoting mechanism includes a shaft rod, a fixed cam, a motion cam and a stopper. The shaft rod is connected to the wearable device and the display mainframe. The fixed cam is axially sleeved on the shaft rod, and fixedly coupled the wearable device. The motion cam is axially sleeved on the shaft rod, and is rotatable along with the display mainframe. The stopper is screwed on the shaft rod to press the motion cam against the fixed cam.

In one or more embodiments of the present disclosure, the display mainframe further includes a display screen disposed in the display-receiving portion. The display screen is oriented to the light-transmissive area for providing display images to the accommodation area via the light-transmissive area.

In one or more embodiments of the present disclosure, the display mainframe further includes a computer electrically connected to the display screen for controlling the display screen.

In one or more embodiments of the present disclosure, the display-receiving portion includes an accommodation space for receiving a replaceable external device.

In one or more embodiments of the present disclosure, two of the pivoting mechanisms are disposed on a middle area of a surface of the display mainframe facing towards the wearable device.

In one or more embodiments of the present disclosure, two of the pivoting mechanisms are respectively disposed on two opposite sides of a surface of the display mainframe facing towards the wearable device.

In another embodiment, a head-mounted display device includes a wearable device, a display mainframe and a pivoting mechanism. The wearable device can be worn on a head of a user. The display mainframe can cover eyes of the user to show display images to the eyes. The pivoting mechanism is pivotally connected to the wearable device and the display mainframe for rotating the display mainframe to stay on a sight line of the eyes and to move away from the sight line of the eyes.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Figure 1:
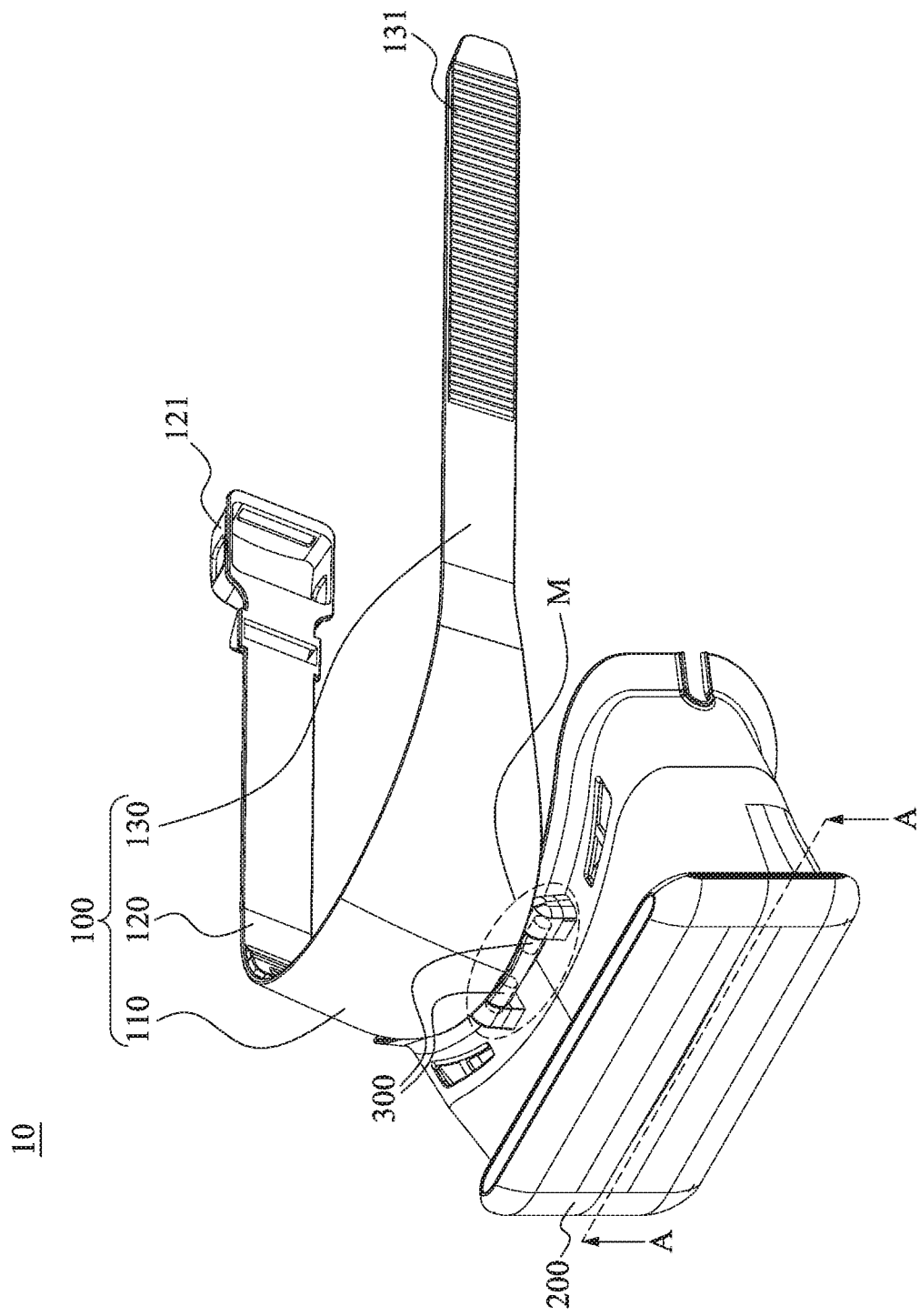
FIG. 1 is a perspective view of a head-mounted display device according to one embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the disclosure.

Because a user wearing a conventional head-mounted display device had to take off the conventional head-mounted display device from the head of the user for changing the sight line of the user from the virtual view to the real view, in view of that, with the wearable device pivotally connected to the display mainframe in the disclosure, the display mainframe can be alternatively rotated to stay on the sight line of human eyes of the user or to leave away from the sight line of the human eyes of the user. Thus, the user is able to conveniently and rapidly switch the sight line of the user between the virtual view and the real view so as to further improve user convenience.

Figure 2A:
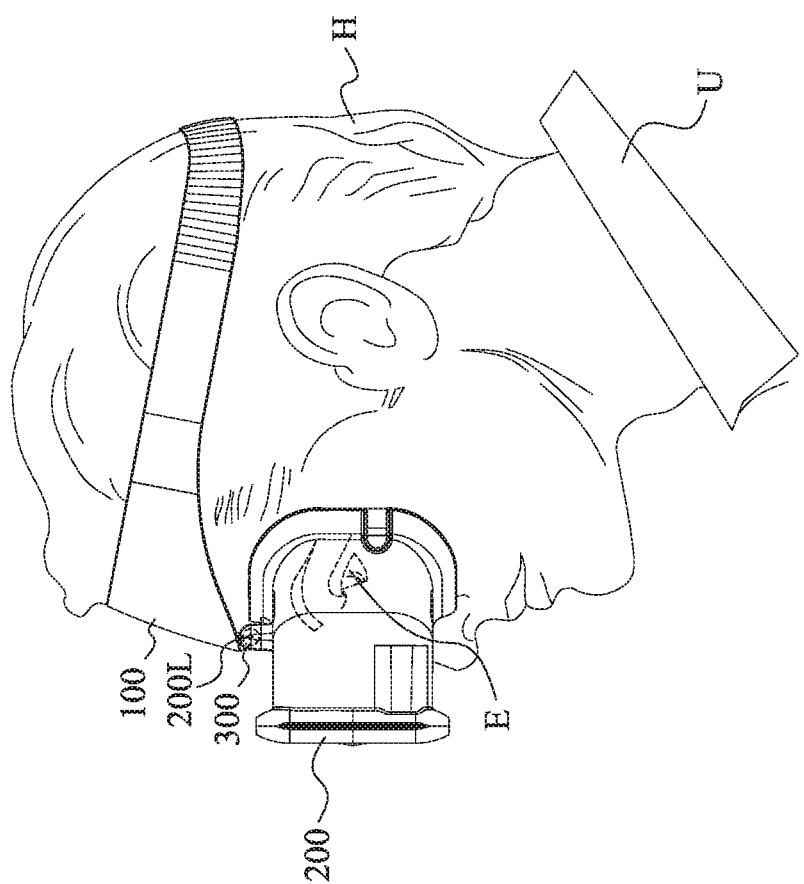
FIG. 2A and FIG. 2B are operational schematic views of a head-mounted display device according to one embodiment of the disclosure.
Figure 2B:
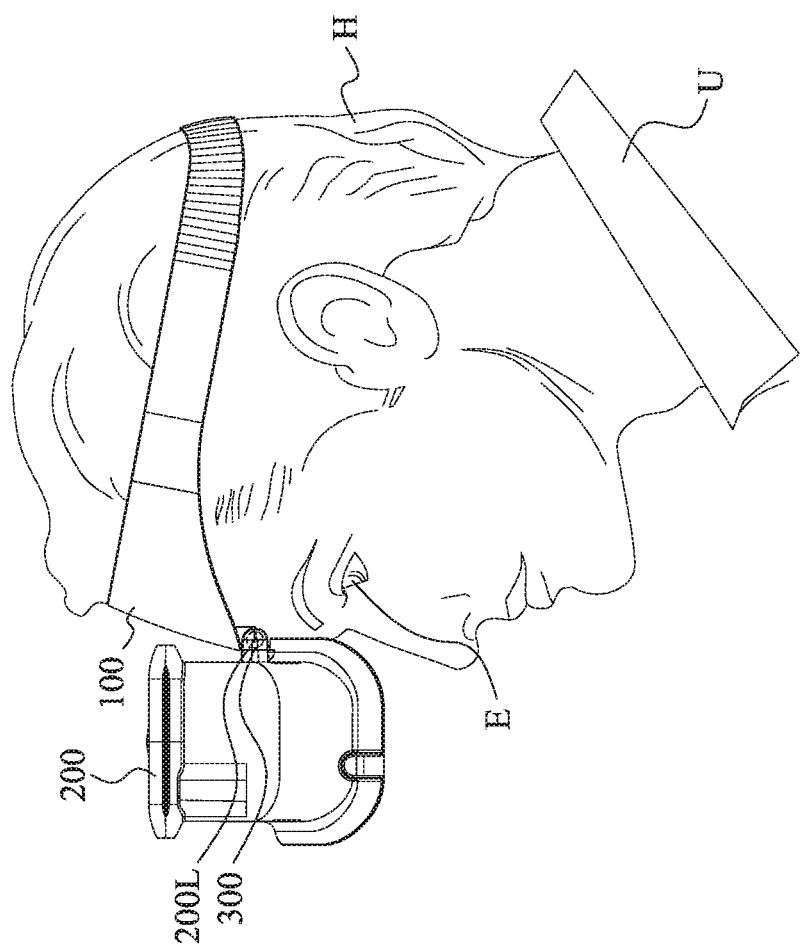

Reference is now made to FIG. 1, FIG. 2A and FIG. 2B, in which FIG. 1 is a perspective view of a head-mounted display device 10 according to one embodiment of the disclosure, and FIG. 2A and FIG. 2B are operational schematic views of a head-mounted display device 10 according to one embodiment of the disclosure. In this embodiment, as shown in FIG. 1 and FIG. 2A, the head-mounted display device 10 includes a wearable device 100, a display mainframe 200 and one or more pivoting mechanisms 300. The number of the pivoting mechanisms 300 is two, for example, however, the number of the pivoting mechanisms is not limited in the disclosure. The wearable device 100 can be worn on a head U of a user H. The display mainframe 200 can cover eyes E of the user H to show display images to the eyes E. The pivoting mechanisms 300 are pivotally connected to the wearable device 100 and the display mainframe 200 for enabling the display mainframe 200 to rotate about a longitudinal direction 200L (i.e., horizontal line) to stay on a sight line of the eyes E or to move away from the sight line of the eyes E.

As shown in FIG. 2A, when the display mainframe 200 is rotated towards the eyes E of the user H to stay on the sight line of the eyes E, that is, the display mainframe 200 is in a use state, the display mainframe 200 covers the eyes E of the user H and shows display images to the eyes E of the user H; on the other hand, as shown in FIG. 2B, when the display mainframe 200 is rotated away from the sight line of the eyes E of the user H, that is, the display mainframe 200 is in a non-use state, the sight line of the eyes E of the user H can be rapidly changed to the real view from the virtual view.

Specifically, in this embodiment, as shown in FIG. 1 and FIG. 2A, the wearable device 100 includes a connection frame 110, a first fastening belt 120 and a second fastening belt 130. The connection frame 110 is arranged between the first fastening belt 120 and the second fastening belt 130, and connected to the first fastening belt 120 and the second fastening belt 130. A hardness of the connection frame 110 is not lower than a hardness of the first fastening belt 120 and a hardness of the second fastening belt 130. The first fastening belt 120 is provided with a first tightening portion 121, and the second fastening belt 130 is provided with a second tightening portion 131. By the first tightening portion 121 and the second tightening portion 131 fastened with each other, the head-mounted display device 10 is able to be worn on the head H of the user U through the wearable device 100, however, the disclosure is not limited thereto. In another embodiment, the wearable device also can be formed in an elastic belt type, a helmet type, a Velcro® type or a hoop type and other conventional types.

Figure 3:
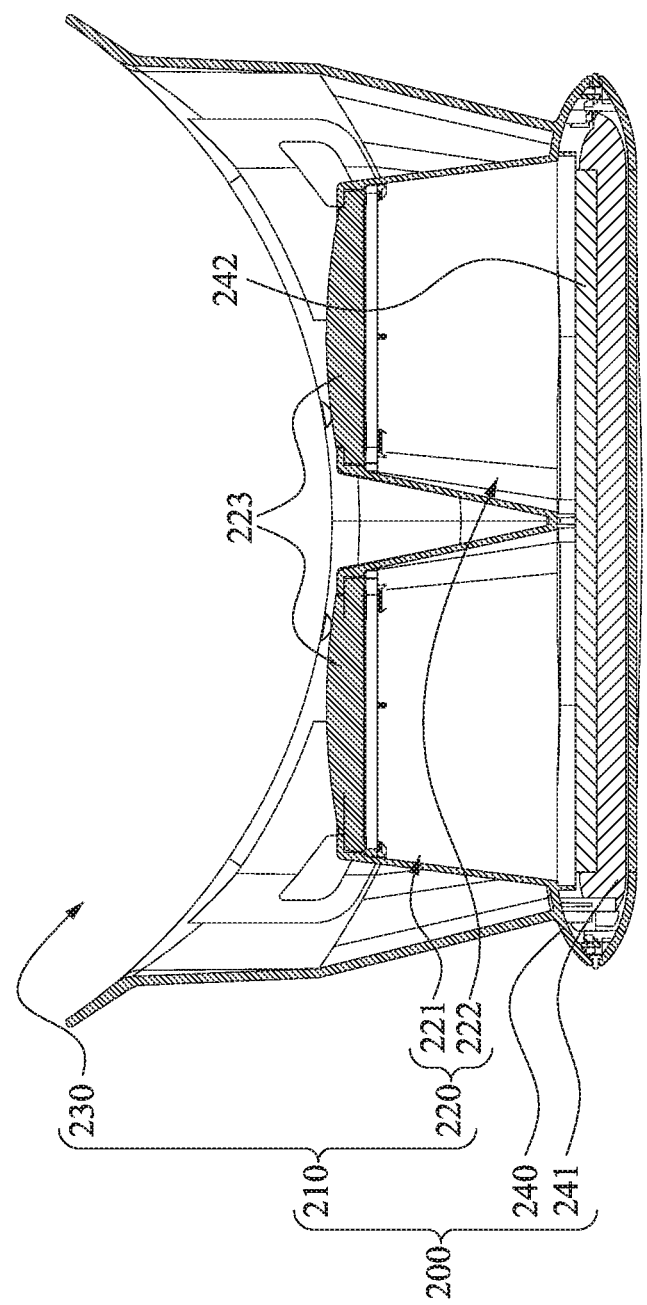
FIG. 3 is a cross-sectional view of the head-mounted display device taken along line A-A of FIG. 1.

FIG. 3 is a cross-sectional view of the head-mounted display device taken along line A-A of FIG. 1. As shown in FIG. 3, particularly, the display mainframe 200 includes a cover body 210, a display-receiving portion 240 and a display screen 241. The cover body 210 is formed with a light-transmissive area 220 and an accommodation area 230. The display-receiving portion 240 is connected to one side of the cover body 210, and the light transmissive area 220 is arranged between the accommodation area 230 and the display-receiving portion 240. The display screen 241 is disposed in the display-receiving portion 240, and a display area 242 of the display screen 241 is oriented to the light-transmissive area 220. Thus, when the cover body 210 covers the eyes of the user, the eyes of the user is in the accommodation area 230 so that the display area 242 of the display screen 241 can provides display images to the eyes of the user via the light-transmissive area 220.

In this embodiment, the display screen 241 is built in the display-receiving portion 240, and is electrically connected to an external computer (not shown in figures) through a cable wire for being controlled by the external computer. However, the disclosure is not limited thereto, in another embodiment, a computer can be internally disposed in the display-receiving portion 240 for controlling the display screen 241; or, in one another embodiment, no display screen is built in the display-receiving portion but an accommodation space for receiving a replaceable external device instead.

Furthermore, the light-transmissive area 220 includes a left chamber 221 and a right chamber 222. Two optical lens 223 are respectively received in the left chamber 221 and the right chamber 222 to respectively align to the left/right eyes of the user. However, the disclosure is not limited thereto, in another embodiment, the light-transmissive area also can be air gap only.

In one embodiment, the display mainframe 200 includes a light-transmissive cover and a see-through waveguide lens (or a projection lens) for supporting augmented reality (AR). In one embodiment, the display mainframe 200 further includes a protective lens for protecting the see-through waveguide lens.

Figure 4:
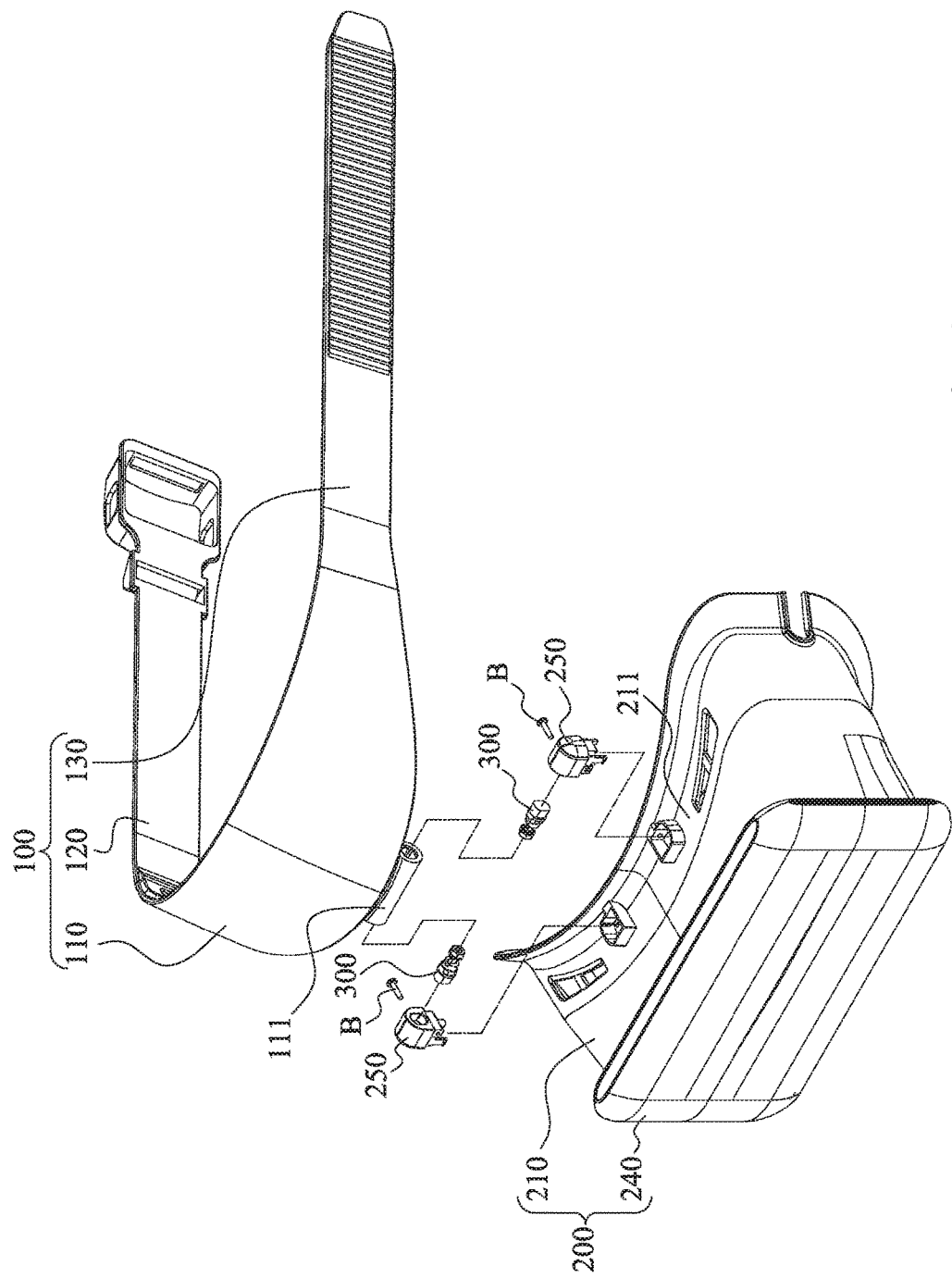
FIG. 4 is an exploded view of the head-mounted display device of FIG. 1.
Figure 5:
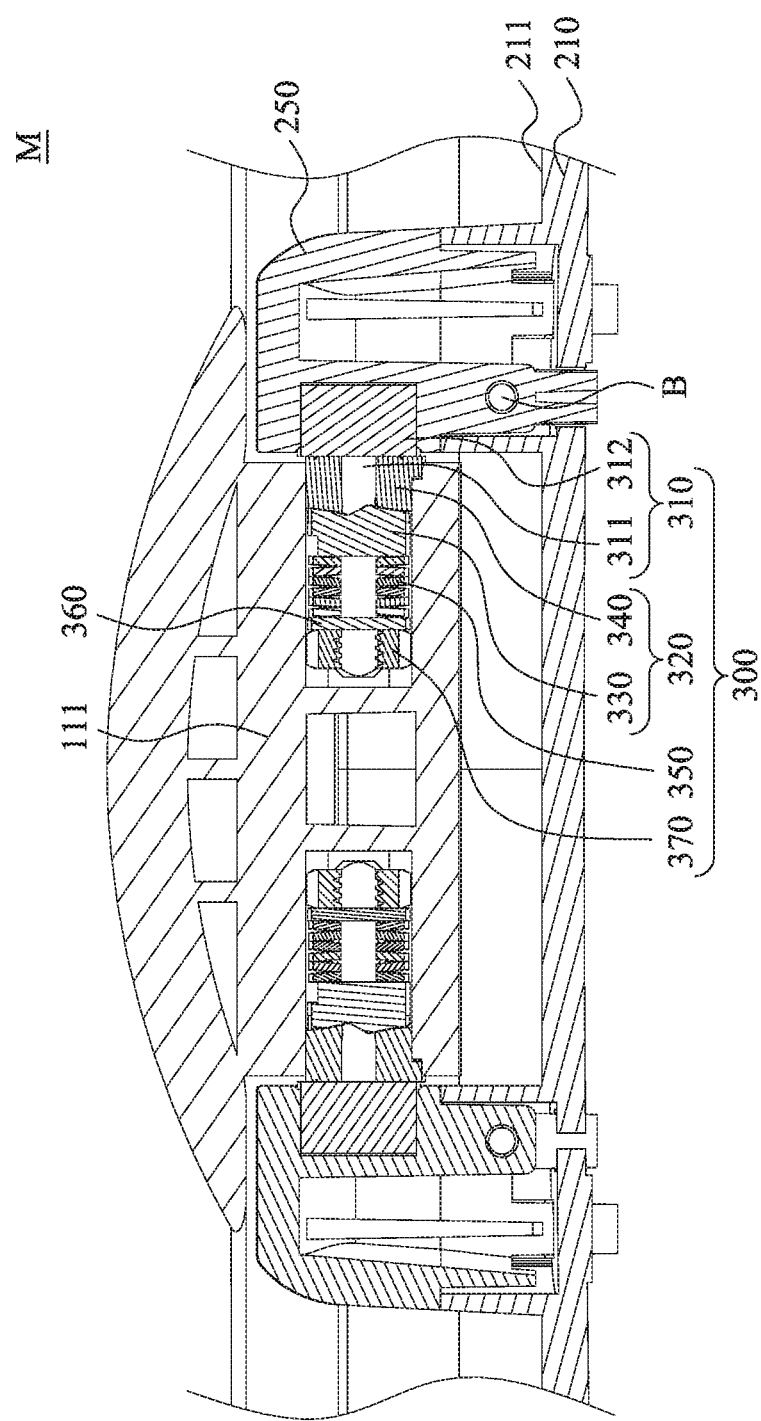
FIG. 5 is a transverse cross-sectional view of the head-mounted display taken along an area M of FIG. 1.

Reference is now made to FIG. 4 and FIG. 5 in which FIG. 4 is an exploded view of the head-mounted display device of FIG. 1 and FIG. 5 is a transverse cross-sectional view of the head-mounted display taken along an area M of FIG. 1. As shown in FIG. 4 and FIG. 5, the wearable device 100 further includes a pivotal sleeve 111 disposed at one lateral edge of the connection frame 110. The display mainframe 200 is provided with two pivot caps 250. Each of the pivoting mechanisms 300 is received in the pivotal sleeve 111 and one of the pivot caps 250 in which one end of the respective pivoting mechanism 300 extends into one end of an inner passage of the pivotal sleeve 111, and the other end of the respective pivoting mechanism 300 is received within one of the pivot caps 250. The pivot caps 250 are fastened on a top surface 211 of the cover body 210 facing towards the wearable device 100 through bolts B. Preferably, the pivoting mechanisms 300 are approximately fixed on a middle area of the top surface 211 of the cover body 210 facing towards the wearable device 100.

Figure 6:
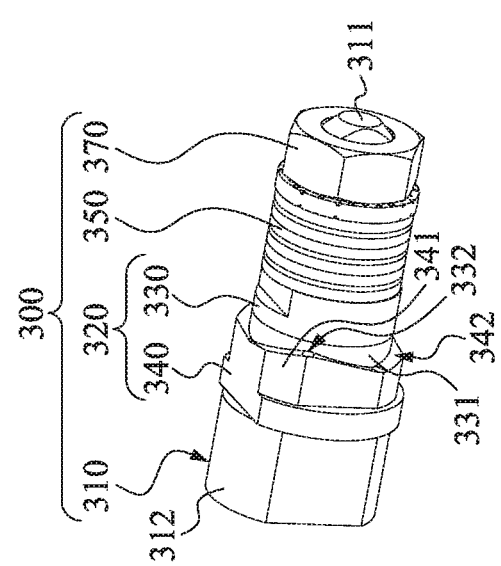
FIG. 6 is an enlarging view of a pivoting mechanism of FIG. 4.

FIG. 6 is an enlarging view of a pivoting mechanism 300 of FIG. 4. As shown in FIG. 6, each of the pivoting mechanism 300 includes a shaft rod 310, a cam set 320, a spring member 350 (e.g., flat wire spring) and a stopper 370. The shaft rod 310 is connected to the wearable device 100 and the display mainframe 200. For example, the shaft rod 310 includes a shaft body 311 and a pivot head 312. The pivot head 312 is connected to one end of the shaft body 311, and is received in one of the pivot caps 250. A cross-sectional area of the pivot head 312 is greater than a cross-sectional area of the shaft body 311. The shaft body 311 extends into the inner passage of the pivotal sleeve 111. The cam set 320 includes a fixed cam 340 and a motion cam 330 which are collectively formed with plastic material, for example. The fixed cam 340 is axially sleeved on the shaft rod 311, and securely sandwiched between the pivot head 312 and the motion cam 330. The fixed cam 340 is fixedly coupled the wearable device 100, for example, the fixed cam 340 is fixedly coupled within the pivotal sleeve 111 so that the fixed cam 340 is rotatable along with the wearable device 100. The motion cam 330 is axially sleeved on the shaft rod 311, and is sandwiched between the spring member 350 and the fixed cam 340. The motion cam 330 is fixedly coupled on the shaft rod 311 so that the motion cam 330 and the shaft rod 310 are rotatable along with the display mainframe 200. Furthermore, the motion cam 330 is rotatably engaged with the fixed cam 340. The spring member 350 is axially sleeved on the shaft rod 311 and is sandwiched between the motion cam 330 and the stopper 370. The stopper 370 is screwed on the shaft rod 310 to press the motion cam 330 against the fixed cam 340. Particularly, the stopper 370, for example, is a screw nut. The screw nut is adjustable screwed on the shaft rod 311 for pressing the spring member 350 and the motion cam 330 against the fixed cam 340 through an o ring 360.

Figure 7:
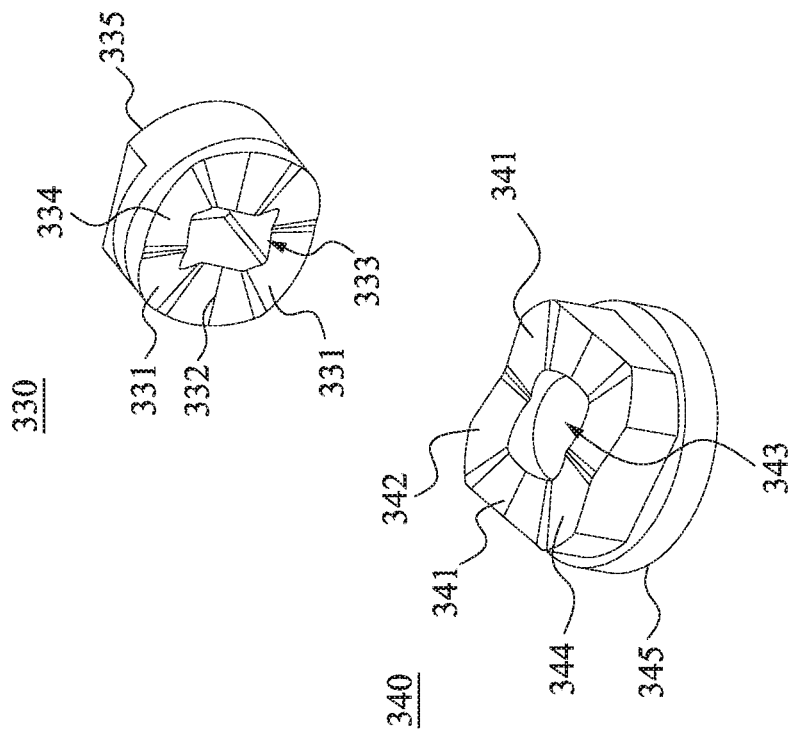
FIG. 7 is a perspective view of a cam set of FIG. 6.
Figure 8:
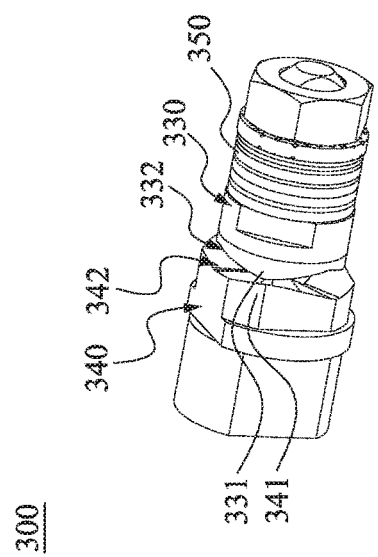
FIG. 8 is an operational schematic view of the pivoting mechanism of FIG. 6.

Reference is now made to FIG. 7 and FIG. 8 in which FIG. 7 is a perspective view of a cam set 320 of FIG. 6, and FIG. 8 is an operational schematic view of the pivoting mechanism 300 of FIG. 6. As shown in FIG. 7, in this embodiment, the motion cam 330 includes a first through hole 333 and a plurality of first convex portions 331 which are equally spaced from each other. The first through hole 333 penetrates through the motion cam 330 to collectively connect two opposite main surfaces 334, 335 of the motion cam 330. The first convex portions 331 are formed at the main surface 334 facing towards the fixed cam 340. Every two first convex portions 331 is defined a first concave portion 332 therebetween. The fixed cam 340 includes a second through hole 343 and a plurality of second convex portions 341 which are equally spaced with each other. The second through hole 343 penetrates through the fixed cam 340 to collectively connect two opposite main surfaces 344, 345 of the fixed cam 340. The second convex portions 341 are formed at the main surface 344 facing towards the motion cam 330. Every two second convex portions 341 is defined a second concave portion 342 therebetween.

Thus, when the display mainframe 200 is operated under the use state (FIG. 2A) or the non-use state (FIG. 2B), as shown in FIG. 6, since the motion cam 330 is engaged with the fixed cam 340, that is, the second convex portions 341 are respectively received in the first concave portions 332 one by one so that the second convex portions 341 respectively abut the first concave portions 332 one by one, meanwhile, the second concave portions 342 respectively receive the first convex portions 331 therein individually, and the first convex portions 331 respectively abut the second concave portions 342 one by one.

For example, when a user U desires to switch the display mainframe 200 operated under the use state (FIG. 2A) or the non-use state (FIG. 2B), the user exerts an external force on the display mainframe 200 to rotate the display mainframe 200, so that the shaft rod 310, the motion cam 330, the spring member 350 and the stopper 370 are collectively rotated at the same time along with the display mainframe 200. Meanwhile, refer to FIG. 8, as the first convex portions 331 are moved outwards from the second concave portions 342 respectively to abut the second convex portions 341 adjacent to the second concave portions 342, the spring member 350 starts to be compressed between the motion cam 330 and the stopper 370 to restore an elastic force; next, while the shaft rod 310, the motion cam 330, the spring member 350 and the stopper 370 are collectively rotated continuously and the user stops to exert the external force, the elastic force of the spring member 350 pushes the first convex portions 331 into the second concave portions 342 which are adjacent to the respective first concave portions 341 for automatically finishing the rotation of the display mainframe 200 relative to the wearable device 100, thus, enabling the display mainframe 200 operated under the use state or the non-use state.

It is noted, as shown in FIG. 7, no matter the display mainframe 200 is operated under the use state (FIG. 2A) or the non-use state (FIG. 2B), since the motion cam 330 and the fixed cam 340 are tightly engaged with each other (FIG. 6), the toque force generated between the motion cam 330 and the fixed cam 340 can securely hold the position of the display mainframe 200 relative to the wearable device 100 under the use state (FIG. 2A) or the non-use state (FIG. 2B).

Figure 9:
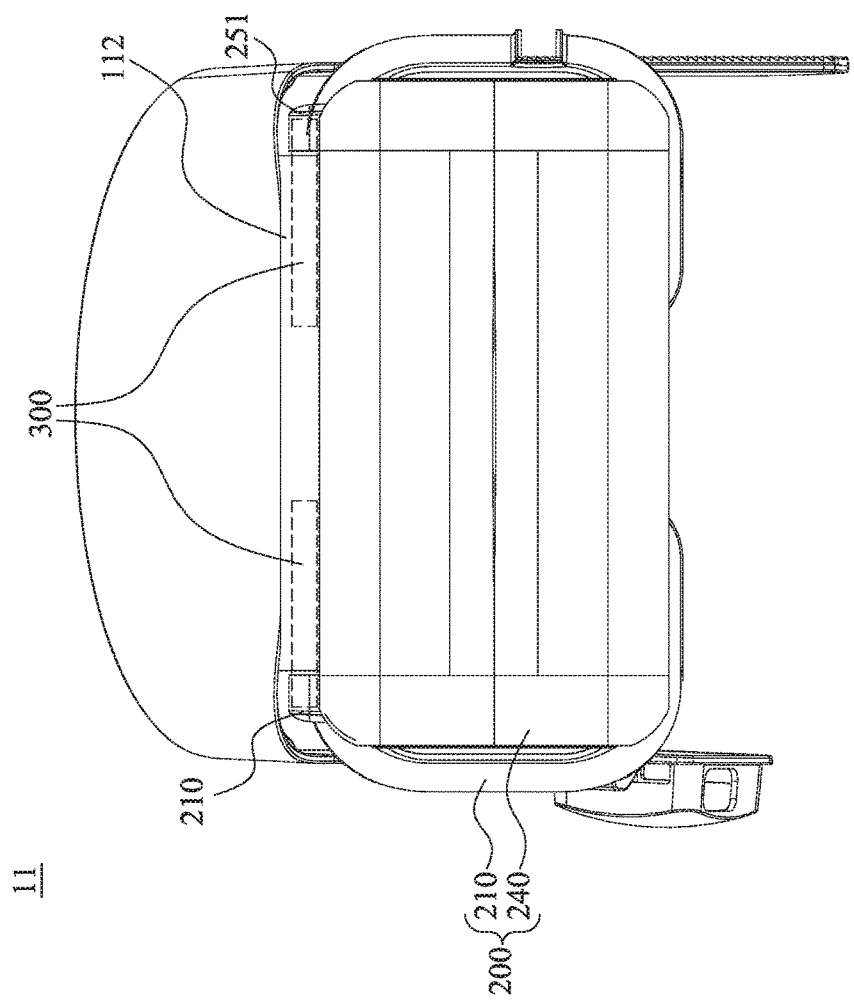
FIG. 9 is a front view of a head-mounted display device according to another embodiment of the disclosure.

FIG. 9 is a front view of a head-mounted display device 11 according to another embodiment of the disclosure. In another embodiment, the head-mounted display device 11 of FIG. 9 is substantially the same as the head-mounted display device 10 of FIG. 1, except that, the two pivoting mechanisms 300 in the embodiment of FIG. 1 are approximately located at the middle area of the top surface 211 of the cover body 210 facing towards the wearable device 100, on the other hand, the two pivoting mechanisms 300 in the embodiment of FIG. 9 are respectively disposed on two opposite sides of a top surface of the display mainframe 200 facing towards the wearable device 100. Specifically, as shown in FIG. 9, the pivot caps 251 are respectively fastened on two opposite sides of the cover body 210, and respectively disposed on two opposite sides of the pivotal sleeve 112.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:
1. A head-mounted display device, comprising:
a wearable device comprising a pivotal sleeve having a passage therein;
a display mainframe comprising
a cover body having a light-transmissive area and an accommodation area, and
a display-receiving portion connected to one side of the cover body, wherein the light-transmissive area is arranged between the accommodation area and the display-receiving portion, and the pivotal sleeve is disposed at one lateral edge of the cover body; and
at least one pivoting mechanism pivotally connected to the wearable device and the display mainframe, and one end of the at least one pivoting mechanism extending into the passage in the pivotal sleeve.

2. The head-mounted display device of claim 1, wherein the display mainframe further comprises a pivot cap receiving the other end of the pivoting mechanism, and the pivot cap is fastened on a surface of the cover body with a bolt.

3. The head-mounted display device of claim 1, wherein the pivoting mechanism comprises:
- a shaft rod connected to the wearable device and the display mainframe;
- a fixed cam axially sleeved on the shaft rod, and fixedly coupled the wearable device;
- a motion cam axially sleeved on the shaft rod, and being rotatable along with the display mainframe; and
- a stopper screwed on the shaft rod to press the motion cam against the fixed cam.

4. The head-mounted display device of claim 1, wherein the display mainframe further comprises a display screen disposed in the display-receiving portion and the display screen is oriented to the light-transmissive area for providing display images to the accommodation area via the light-transmissive area.

5. The head-mounted display device of claim 4, wherein the display mainframe further comprises a computer electrically connected to the display screen for controlling the display screen.

6. The head-mounted display device of claim 1, wherein the display-receiving portion comprises an accommodation space for receiving a replaceable external device.

7. The head-mounted display device of claim 1, wherein the at least one pivoting mechanism includes two pivoting mechanisms respectively disposed on a middle area of a top surface of the display mainframe facing towards the wearable device.

8. The head-mounted display device of claim 1, wherein the at least one pivoting mechanism includes two pivoting mechanisms respectively disposed on two sides opposite to each other of a top surface of the display mainframe facing towards the wearable device.

9. A head-mounted display device, comprising:
- a wearable device for being worn on a head of a user, and the wearable device comprising a pivotal sleeve having a passage therein;
- a display mainframe for covering eyes of the user to show display images to the eyes; and
- a pivoting mechanism pivotally connected to the wearable device and the display mainframe for rotating the display mainframe to stay on a sight line of the eyes and to move away from the sight line of the eyes, the pivotal sleeve being disposed at one lateral edge of the display mainframe, and one end of the pivoting mechanism extending into the passage in the pivotal sleeve.

* * * * *